(12) United States Patent
Reusswig et al.

(10) Patent No.: US 6,398,291 B1
(45) Date of Patent: Jun. 4, 2002

(54) COLLAPSIBLE VEHICLE MID-GATE WITH SEAT COMPONENTS FIXED THEREON

(75) Inventors: Holger Reusswig, Dietzenbach (DE); Terrence D. Gibney, Jr., New Hudson, MI (US); Stanislaw Andrzeg Wieclawski, Gross-Gerau (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/849,073

(22) Filed: May 4, 2001

(51) Int. Cl.$^7$ .......................... B62D 33/06; B62D 33/02
(52) U.S. Cl. ............... 296/183; 296/190.11; 296/26.11; 296/146.16; 296/201; 296/65.05
(58) Field of Search ...................... 296/190.11, 190.08, 296/183, 26.11, 146.16, 201, 65.05

(56) References Cited

U.S. PATENT DOCUMENTS

| | | | |
|---|---|---|---|
| 3,169,792 A | 2/1965 | Viquez | |
| 4,312,521 A | * 1/1982 | Thomas et al. | 242/379.1 |
| 4,315,653 A | 2/1982 | Sparling | |
| 4,480,868 A | 11/1984 | Koto | |
| 4,607,886 A | * 8/1986 | Mazhar | 248/118 |
| 4,637,648 A | * 1/1987 | Okino et al. | 296/63 |
| 4,659,136 A | 4/1987 | Martin et al. | |
| 4,750,778 A | 6/1988 | Hoban | |
| 5,087,091 A | 2/1992 | Madill | |
| 5,531,497 A | 7/1996 | Cheng | |
| 5,934,727 A | 8/1999 | Storc et al. | |
| 6,076,880 A | 6/2000 | Coffer et al. | |
| 6,149,223 A | 11/2000 | Baessler et al. | |
| 6,260,916 B1 | * 7/2001 | Hunt | 296/146.16 |

FOREIGN PATENT DOCUMENTS

JP    411-342793 A    12/1999

* cited by examiner

Primary Examiner—Stephen T. Gordon
Assistant Examiner—Lori L Coletta
(74) Attorney, Agent, or Firm—Brooks & Kushman P.C.

(57) ABSTRACT

A vehicle configuration includes a cab portion and a cargo box. The cargo box has a front wall adjacent the cab portion. The vehicle configuration is adaptable for carrying a cargo load longer than the cargo box. A collapsible seat back is positioned against the front wall and structurally supported by the front wall. The seat back is collapsible in a forward direction to a substantially flat position in the vehicle. A headrest is fixed to the front wall. The front wall is collapsible onto the seat back in the cab portion when the seat back is in the substantially flat position such that the headrest is collapsible with the front wall. In this configuration, a longer load may extend from the cargo box into the cab portion on top of the collapsed front wall.

9 Claims, 6 Drawing Sheets

COLLAPSIBLE VEHICLE MID-GATE WITH SEAT COMPONENTS FIXED THEREON

BACKGROUND OF THE INVENTION

1. Field of the Invention

The present invention relates to a collapsible mid-gate for a vehicle with a headrest and seatbelt fixed to the mid-gate to reduce the weight of a collapsible seat assembly positioned against the mid-gate.

2. Background Art

As the popularity of pickup trucks and vans increases, it has become desirable to provide vehicles that have rearward extended cab portions suitable for carrying more than three passengers. However, this extended cab configuration reduces the load carrying capacity of the cargo box on the rear of the vehicle, such as on a pick-up truck.

It is known in the prior art to provide a hole or passage between the cab portion and the cargo box portion for carrying a somewhat longer load on the floor of a pickup truck. Such a configuration is shown in U.S. Pat. No. 5,934,727, which is hereby incorporated by reference in its entirety. The '727 patent teaches a pickup truck configuration which is adaptable for carrying a cargo load longer than the cargo box and at or above the wheel covers protruding into the cargo box. The adaptable pickup truck configuration includes a cab portion and a cargo box. A box panel portion is pivotally connected to a front wall of the cargo box and is movable to a generally horizontal position in which the box panel portion partially overlies and is supported by the wheel covers. The cargo box includes a cargo box opening when the box panel portion is in the generally horizontal position. The cab panel portion is pivotally mounted to the cab portion and is movable between a generally vertical closed position and a generally horizontal open position. The cab portion has a cab opening when the cab panel portion is in the generally horizontal position and the cab portion is at least partially aligned with the cargo box opening. Accordingly, the pickup truck configuration is adaptable to carry a cargo load longer than the cargo box through both the cab portion and the cargo box and also can carry a wider load above the wheel covers.

It is desirable to provide an improved vehicle configuration which allows storage of longer loads extending between a cab and a cargo box while reducing manufacturing and assembly costs and weight.

DISCLOSURE OF THE INVENTION

The present invention provides a collapsible mid-gate seat module in which components of the seat assembly are integrated into the collapsible mid-gate to reduce the weight of the seat assembly, and thereby reduce costs associated with manufacture, assembly and installation of the seat assembly. Preferably, the headrest and seatbelt assembly associated with the collapsible seat are secured to the collapsible mid-gate. The "mid-gate" also forms the front wall of the cargo box, and the terms "front wall" and "mid-gate" are used interchangeably in this description.

More specifically, the present invention provides a vehicle configuration including a cab portion and a cargo box, the cargo box having a front wall adjacent the cab portion. The vehicle configuration is adaptable for carrying a cargo load longer than the cargo box. The vehicle configuration includes a collapsible seat back positioned against the front wall and structurally supported by the front wall. The seat back is collapsible in a forward direction to a substantially flat position in the vehicle. A headrest is fixed to the front wall. The front wall is collapsible onto the seat back in the cab portion when the seat back is in the substantially flat position such that the headrest is collapsible with the front wall, whereby a longer load may extend from the cargo box into the cab portion on top of the collapsed front wall.

Accordingly, an object of the invention is to provide a collapsible vehicle mid-gate which separates a cargo box from a cab portion of a vehicle, wherein the mid-gate includes seat components fixed thereto, such as a headrest or seatbelt, to reduce the weight and manufacturing costs of a collapsible seat back which is positioned against the collapsible mid-gate.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Certain specific terminology will be employed for the sake of clarity in the particular embodiment described in accordance with 35 U.S.C. § 112, but it is understood that the same is not intended to be limiting and should not be so construed in as much as the invention is capable of taking many forms and variations within the scope of the appended claims.

Figure 1:
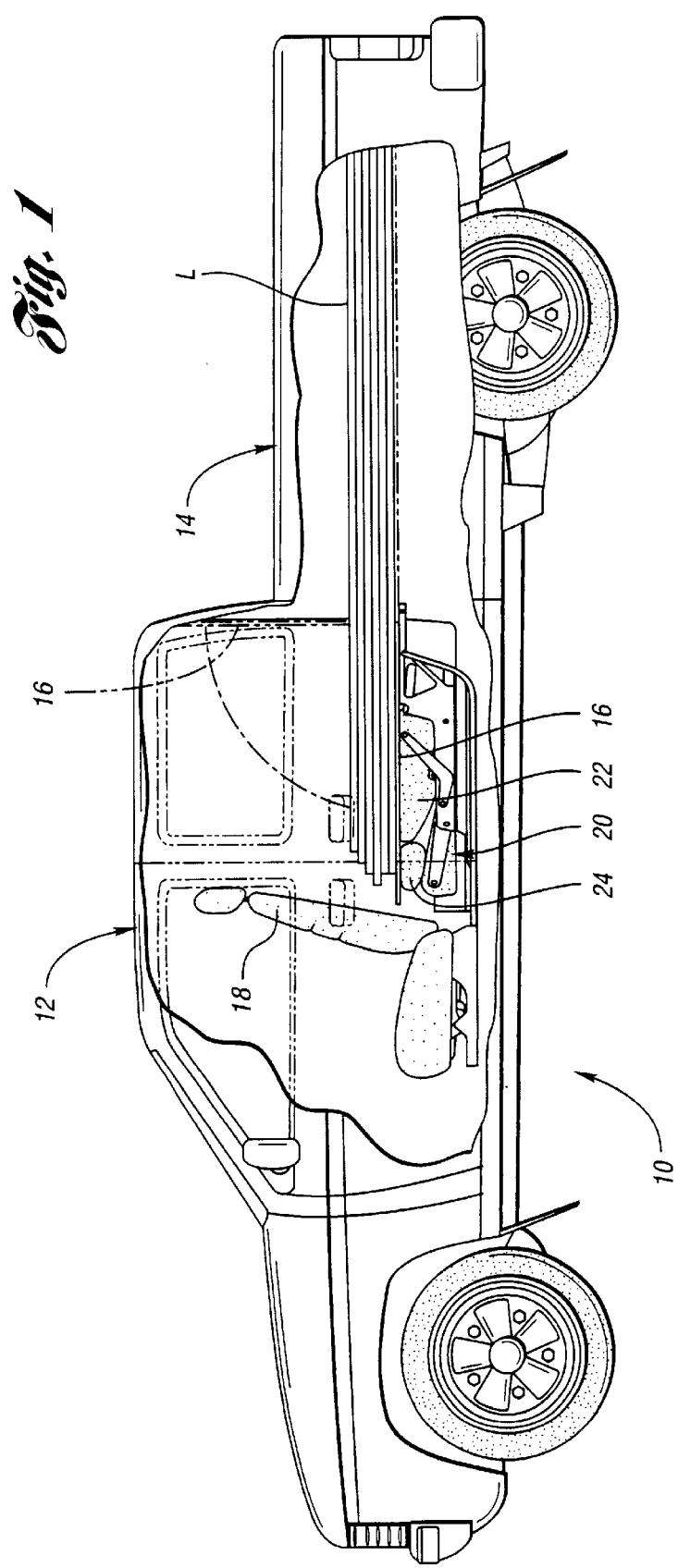
FIG. 1 shows a schematic side view of a vehicle configuration in accordance with the present invention.

Referring to FIG. 1, a vehicle configuration 10 is shown in schematic side view. In this particular embodiment, the vehicle configuration is a pickup truck which includes a cab portion 12 and a cargo box 14. The cargo box 14 has a front wall ("mid-gate") 16 adjacent the cab portion 12. The front wall 16 separates the cab portion 12 from the cargo box 14. The vehicle has a front seat 18 and a collapsible rear seat 20, which includes a collapsible seat back 22. The collapsible seat back 22, when in the upright position, is supported by the front wall 16.

As illustrated in FIG. 1, the collapsible seat back 22 is collapsible in a forward direction to a substantially flat position in the vehicle, and the front wall 16 may be collapsed onto the seat back 22 in the cab portion 12 when the seat back 22 is in the flat position. The front wall 16 includes a headrest 24 bolted thereon and corresponding with the seat back 22 such that in the upright position the headrest 24 is positioned above the seat back 22 to support the head of an occupant seated on the collapsible rear seat 20.

As illustrated in FIG. 1, with collapsible rear seat assembly 20 and front wall 16 in the collapsed position, a cargo load L which is longer than the cargo box 14 may be carried by the vehicle.

Figure 2:
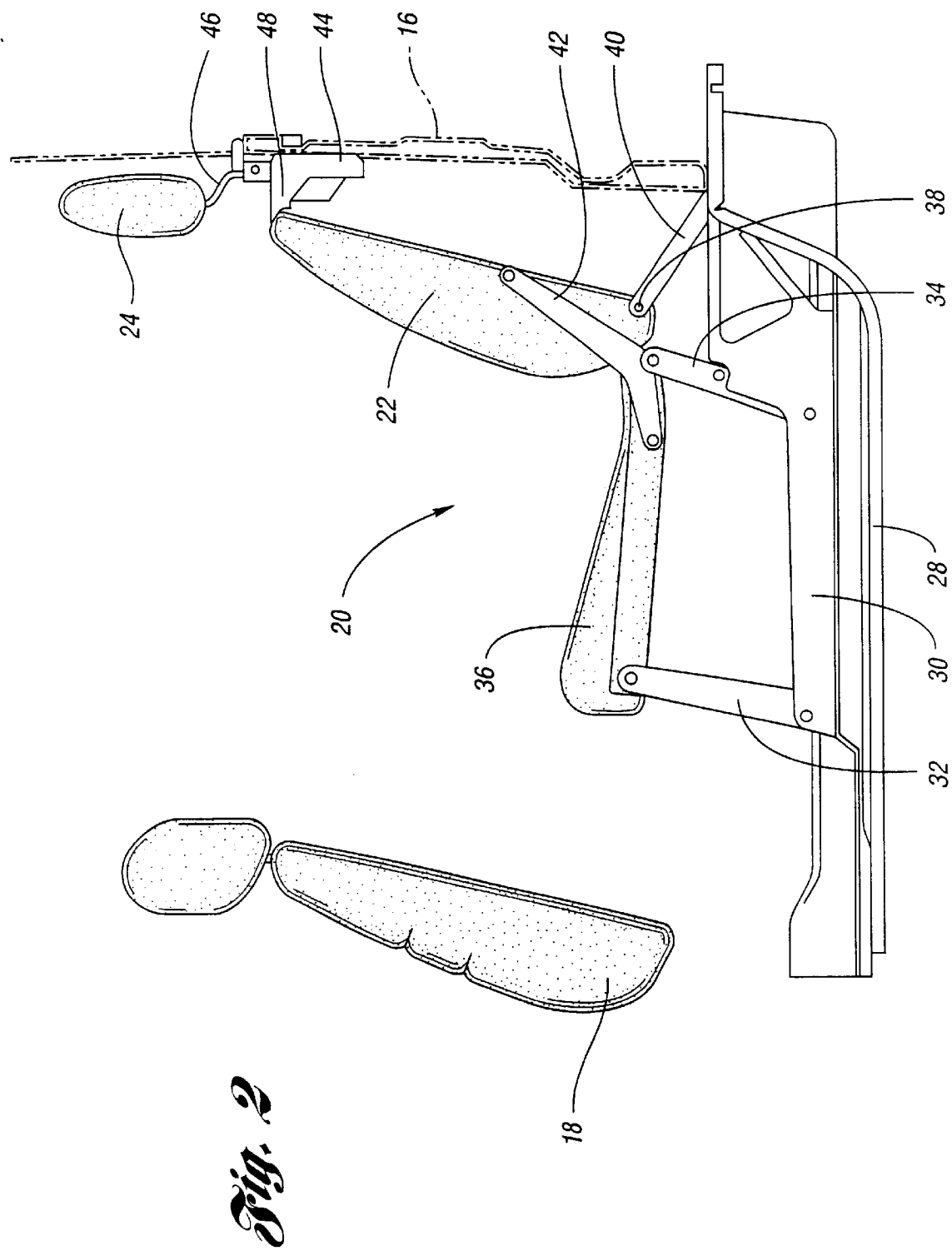
FIG. 2 shows a side view of a collapsible seat and mid-gate in accordance with the present invention.

FIG. 2 shows a side view of the collapsible rear seat assembly 20 supported on a vehicle floor 28. The collapsible rear seat assembly 20 includes a riser 30 with a parallelogram linkage 32,34 which supports the lower seat 36 and allows collapse of the lower seat back 36. The seat back 22 is pivotable about a pivot joint 38 on a link 40. An L bracket 42 is pivotally connected at opposing ends to the lower seat 36 and seat back 22, respectively.

The front wall/mid-gate 16 includes a headrest support bracket 44 which supports the headrest on guide tubes 46. A link member 48 extends from the headrest support bracket and is releasably latched to the top of the seat back 22. In this configuration, the seat back 22 is structurally supported by the link member 48, headrest support bracket 44, and the front wall 16.

Figure 3:
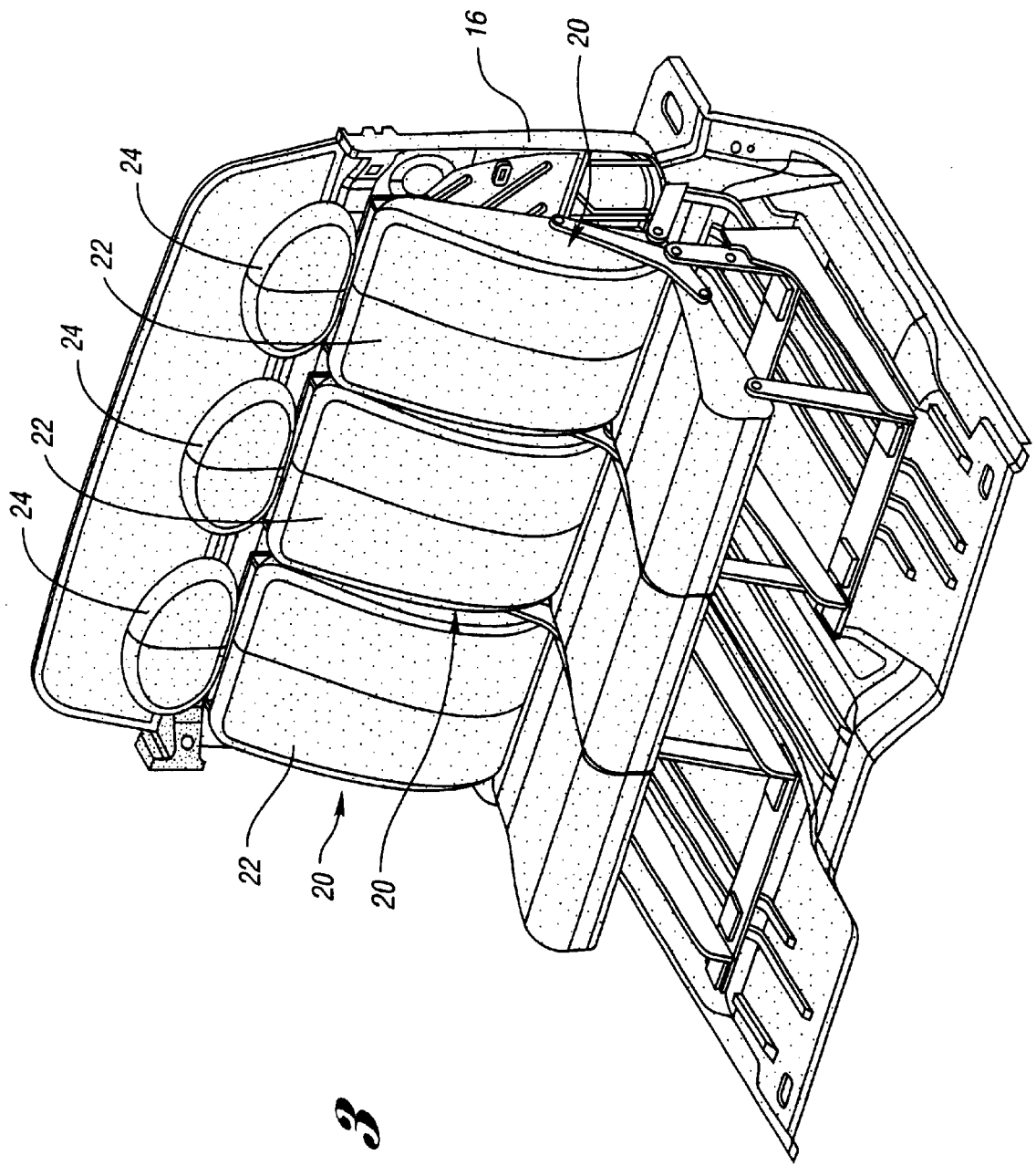
FIG. 3 shows a perspective view of a collapsible seat and midgate assembly with the seats in the upright position.
Figure 4:
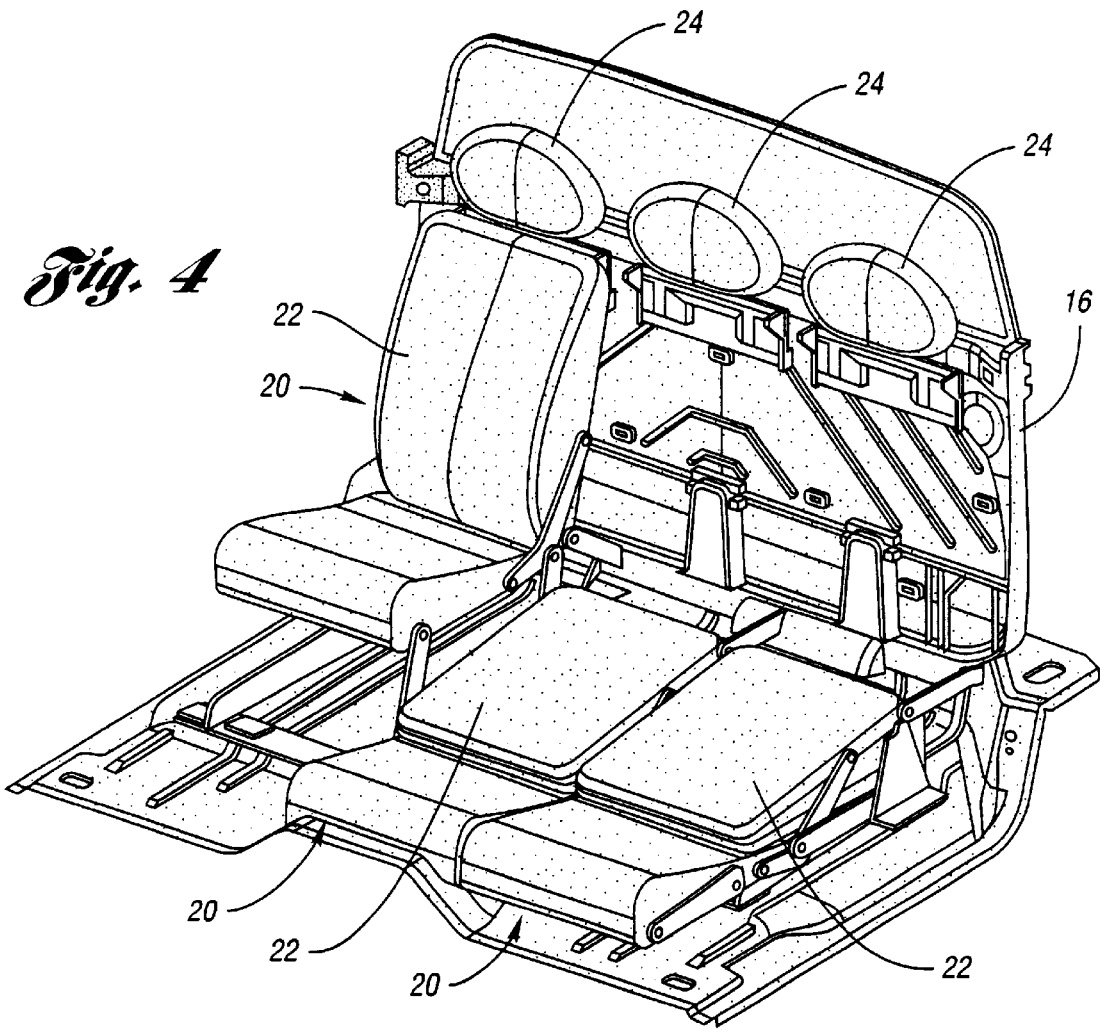
FIG. 4 shows a perspective view of the collapsible seat and midgate assembly of FIG. 3 with two of the seats collapsed.
Figure 5:
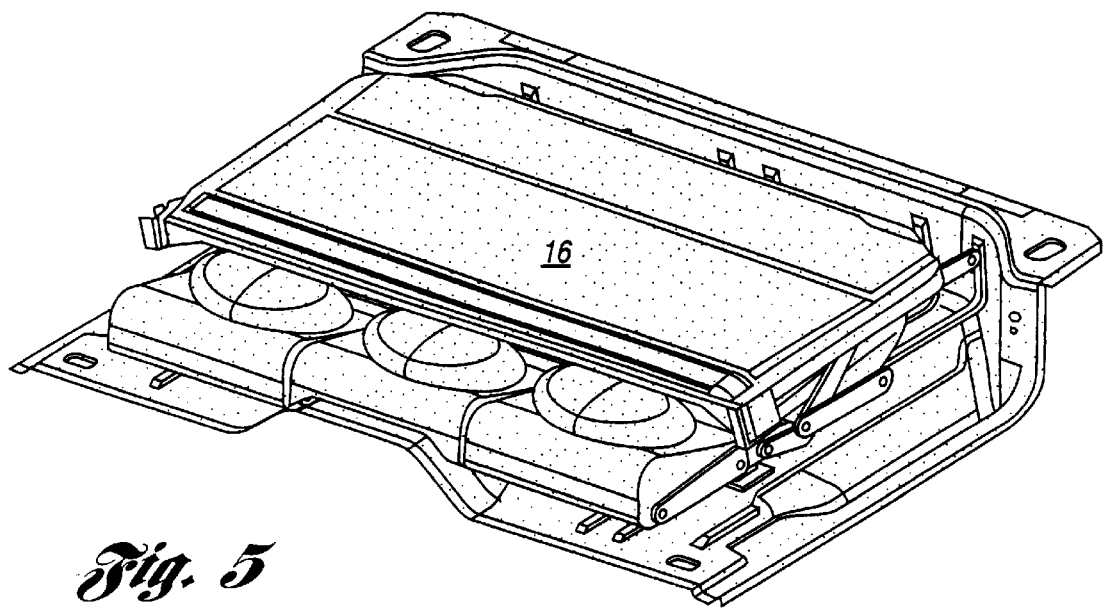
FIG. 5 shows a perspective view of the collapsible seat and midgate assembly of FIG. 3 with the seats and mid-gate collapsed.

FIGS. 3–5 illustrate the sequential collapse of the seat backs 22 and front wall 16 to a horizontal position. FIG. 3 illustrates the rear seat assemblies 20 in the upright position, with the seat backs 22 structurally supported by the front wall 16. The headrests 24 are affixed to the front wall/mid-gate 16. FIG. 4 shows two of the collapsible rear seat assemblies 20 collapsed to the substantially horizontal position. As shown, the seat backs 22 are detachable and separately collapsible from the front wall 16.

FIG. 5 shows the front wall 16 collapsed to a horizontal position on top of the collapsed rear seat assemblies 20.

With the seat back 22 being structurally supported by the front wall/mid-gate 16, the weight of the collapsible rear seat assembly 20 may be considerably reduced, which reduces manufacturing costs. A metal seat back frame is not required in the seat back 22, and a plastic support structure, as described later with reference to FIGS. 8–11, can be used, thereby reducing weight. Also, the headrest 24 and its support structure are secured to the front wall/mid-gate 16.

Figure 6:
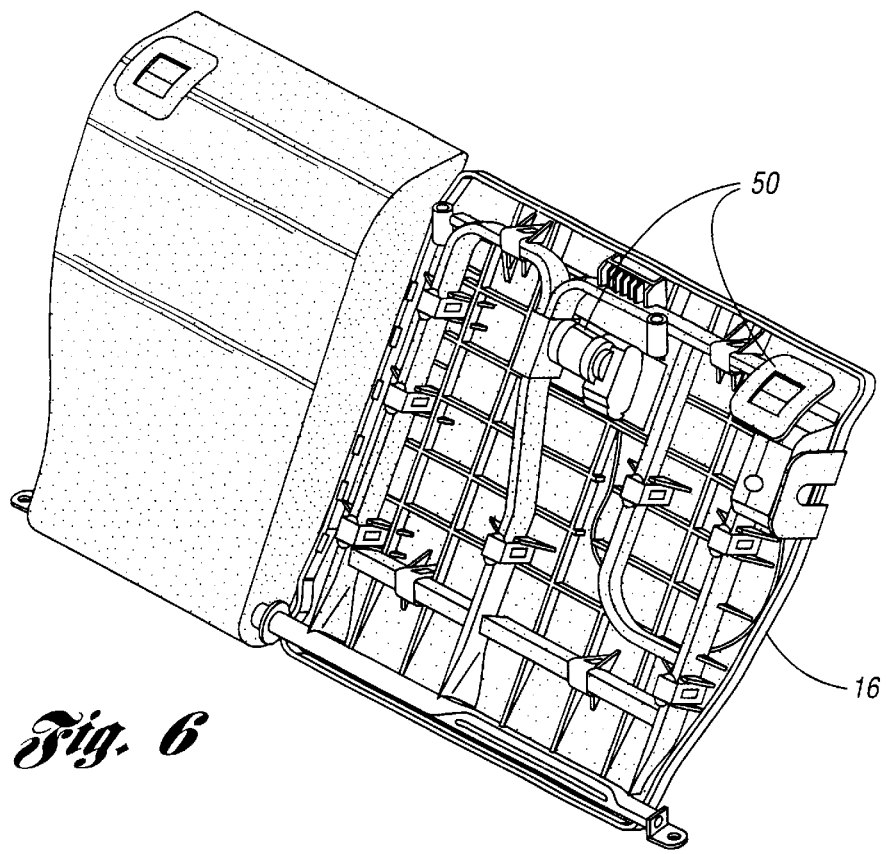
FIG. 6 shows a perspective view of a partially disassembled midgate in accordance with the invention.
Figure 7:
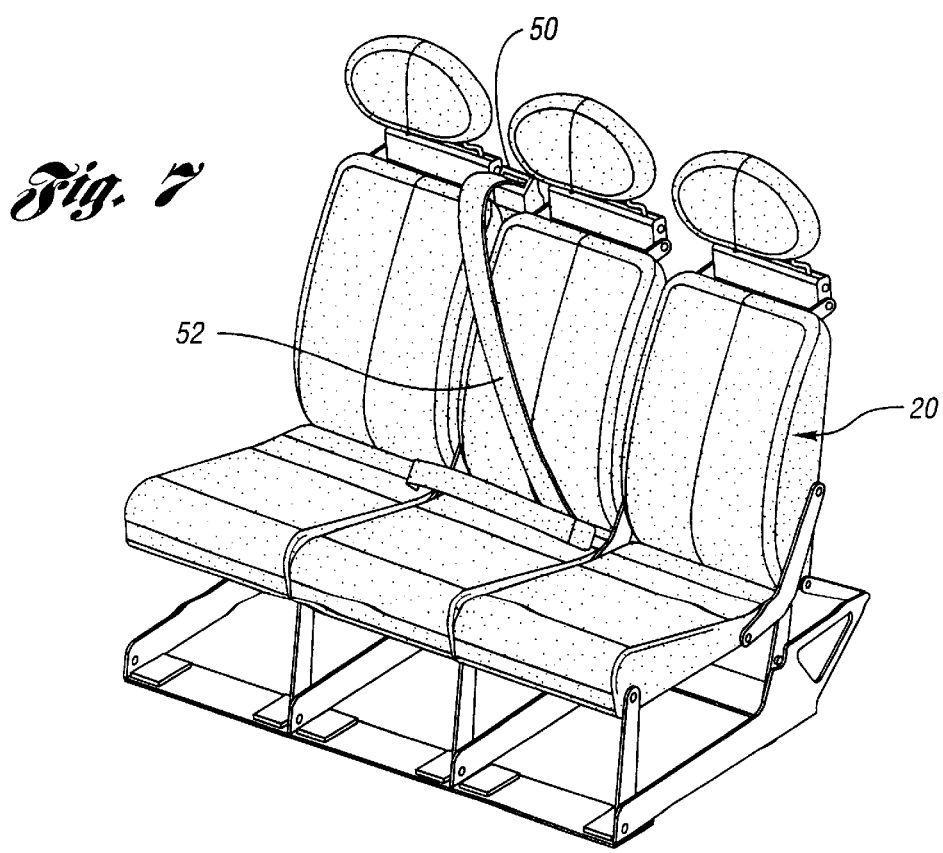
FIG. 7 shows a perspective view of a collapsible seat assembly with a seatbelt secured to the mid-gate in accordance with the invention.

As shown in FIG. 6, the seat belt assembly 50 may also be fixed to the front wall 16. FIG. 7 shows the relationship between the seatbelt assembly 50, including the seatbelt 52, and the collapsible rear seat assembly 20, with the seatbelt assembly 50 supported by the front wall/mid-gate 16.

Figure 8:
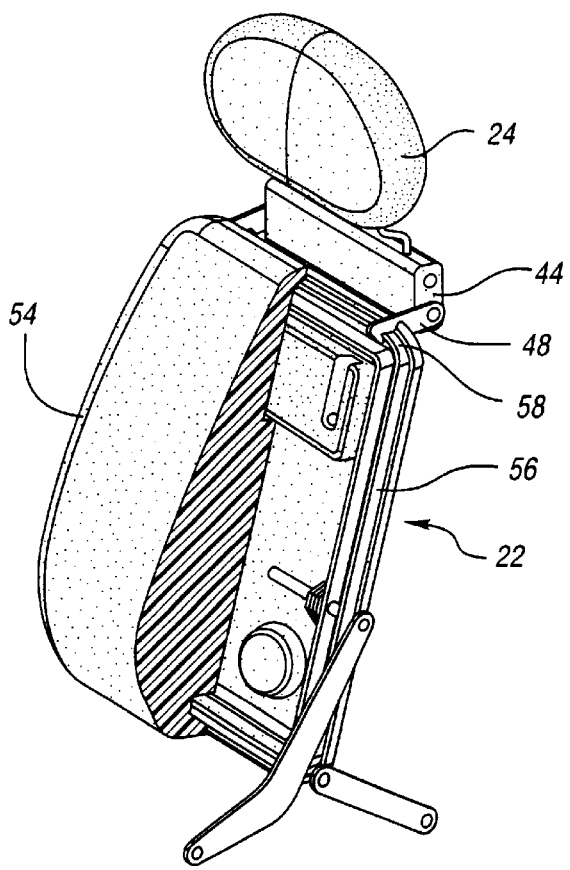
FIG. 8 shows a partially cut away perspective view of a collapsible seat assembly in accordance with the invention.
Figure 9:
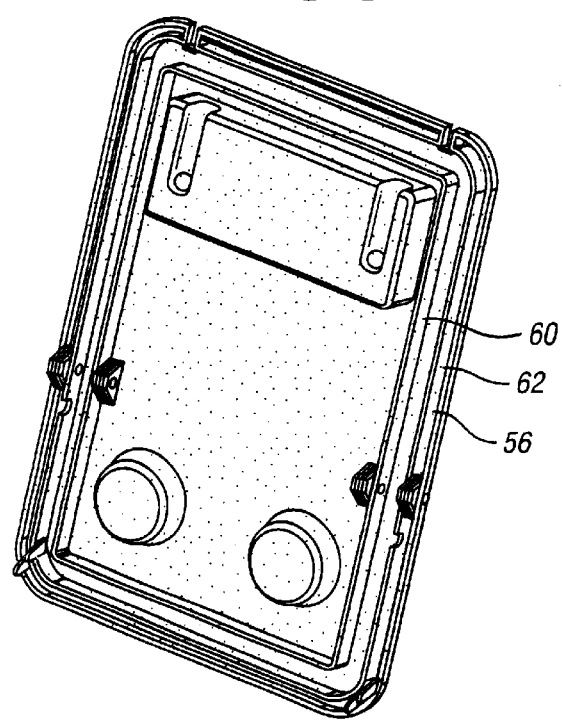
FIG. 9 shows a perspective view of a plastic back panel as shown in FIG. 8.
Figure 10:
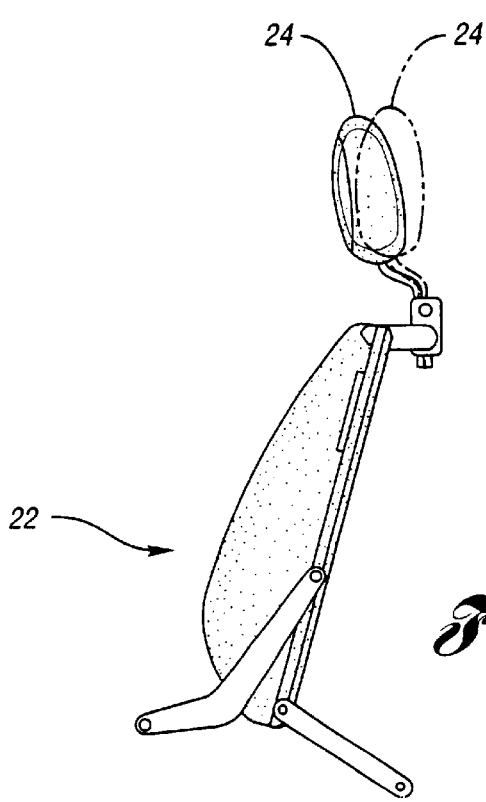
FIG. 10 shows a side view of the assembly of FIG. 8 illustrating headrest position before and after impact.

FIGS. 8–10 show the seat back 22 in various views, including a partially cut away view in FIG. 8 in which the cushion 54 is cut away to show the plastic support panel 56 which supports the cushion 54. As shown in FIG. 8, the headrest support bracket 44 includes a latch/link member 48 which is selectively latched and unlatched with respect to the top 58 of the plastic support panel 56. Specifically, the link member 48 is selectively latched and unlatched around a pivot rod on the top 58 of the plastic panel 56. As shown, there is no need for a steel structure because the plastic support panel 56 is attached to the front wall/mid-gate 16 by the link member 48 and headrest support bracket 44, which provides sufficient support for the seat.

FIG. 9 shows a perspective view of the plastic support panel 56 of the seat back 22. The rib structure 60,62 extends around the periphery of the support panel 56, and provides significant strength to the support panel 56. FIG. 10 shows a side view of the rear seat back 22 and illustrates the adjusted or activated position of the headrest 24 before and after actuation upon an impact. As shown, a body impact into the seat back 22 actuates forward movement of the headrest 24 to a forward position through a linkage structure (not shown). This structure may function similarly to the actuating headrest described in U.S. Pat. No. 5,795,019, for example, which is hereby incorporated by reference in its entirety.

While the best mode for carrying out the invention has been described in detail, those familiar with the art to which this invention relates will recognize various alternative designs and embodiments for practicing the scope of the invention within the scope of the appended claims.

What is claimed is:

1. A vehicle configuration including a cab portion and a cargo box, the cargo box having a front wall adjacent the cab portion, the vehicle configuration being adaptable for carrying a cargo load longer than the cargo box, the vehicle configuration comprising:

a collapsible seat back positioned against the front wall and structurally supported by the front wall, said seat back being collapsible in a forward direction to a substantially flat position in the vehicle; and a headrest fixed to the front wall, the front wall being collapsible onto the seat back in the cab portion when the seat back is in said substantially flat position such that the headrest is collapsible with the front wall, whereby a longer load may extend from the cargo box into the cab portion on top of the collapsed front wall.

2. The vehicle configuration of claim 1, wherein the seat back is separately collapsible from the front wall.

3. The vehicle configuration of claim 1, farther comprising a seat belt fixed to the front wall for use by a vehicle passenger seated against said seat back.

4. The vehicle configuration of claim 1, wherein the seat back is releasably latched to the front wall.

5. A vehicle configuration comprising:

a cab having a front seat and a rear seat with a seat back, the seat back being pivotable between an upright position and a generally horizontal position;

a cargo box having a front wall which encloses the cab and separates the cargo box from the cab, said front wall being collapsible on top of the seat back when the seat back is in the generally horizontal position to enable longer cargo loads to extend from the cargo box into the cab;

wherein said front wall includes a headrest fixed thereto corresponding with the seat back to minimize weight of the seat back.

6. The vehicle configuration of claim 5, wherein the seat back is separately collapsible from the front wall.

7. The vehicle configuration of claim 5, further comprising a seat belt fixed to the front wall for use by a vehicle passenger seated against said seat back.

8. The vehicle configuration of claim 5, wherein the seat back is releasably latched to the front wall.

9. A vehicle configuration including a cab portion and a cargo box, the cargo box having a front wall adjacent the cab portion, the vehicle configuration being adaptable for carrying a cargo load longer than the cargo box, the vehicle configuration comprising:

a collapsible seat back positioned against the front wall and structurally supported by the front wall, said seat back being collapsible in a forward direction to a substantially flat position in the vehicle; and a headrest and seat belt fixed to the front wall, the front wall being collapsible onto the seat back in the cab portion when the seat back is in said substantially flat position such that the headrest and seat belt are collapsible with the front wall, whereby a longer load may extend from the cargo box into the cab portion on top of the collapsed front wall.

\* \* \* \* \*

UNITED STATES PATENT AND TRADEMARK OFFICE
CERTIFICATE OF CORRECTION

PATENT NO. : 6,398,291 B1
DATED : June 4, 2002
INVENTOR(S) : Reusswig et al.

It is certified that error appears in the above-identified patent and that said Letters Patent is hereby corrected as shown below:

<u>Column 4,</u>
Line 37, after "claim 1," replace "farther" with -- further --

Signed and Sealed this

Third day of September, 2002

*Attest:*

*Attesting Officer*

JAMES E. ROGAN
*Director of the United States Patent and Trademark Office*